US008849561B2

(12) United States Patent
Bell et al.

(10) Patent No.: US 8,849,561 B2

(45) Date of Patent: Sep. 30, 2014

(54) DETERMINING THE LOCATION OF AN INCIDENT AFFECTING TRAFFIC

(71) Applicant: International Business Machines Corporation, Armonk, NY (US)

(72) Inventors: David R. Bell, Southampton (GB); Robert Watts, Leeds (GB); David P. Roe, Durham (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/733,915

(22) Filed: Jan. 4, 2013

(65) Prior Publication Data

US 2014/0195142 A1 Jul. 10, 2014

(51) Int. Cl.

*G06F 17/00* (2006.01)
*G06F 19/00* (2011.01)
*G01C 21/26* (2006.01)

(52) U.S. Cl.

CPC .................................... *G01C 21/26* (2013.01)
USPC .................................... 701/400

(58) Field of Classification Search

USPC .................................... 701/400
See application file for complete search history.

(56) References Cited

U.S. PATENT DOCUMENTS

| | | | | |
|---|---|---|---|---|
| 5,610,821 A | 3/1997 | Gazis et al. | | |
| 5,818,356 A | 10/1998 | Schuessler | | |
| 6,480,783 B1 | 11/2002 | Myr | | |
| 6,615,130 B2 | 9/2003 | Myr | | |
| 2008/0046165 A1* | 2/2008 | Downs et al. | | 701/117 |
| 2009/0043486 A1 | 2/2009 | Yang et al. | | |
| 2009/0125160 A1 | 5/2009 | Desai et al. | | |
| 2011/0224892 A1 | 9/2011 | Speiser | | |

FOREIGN PATENT DOCUMENTS

| | | |
|---|---|---|
| EP | 1103039 B1 | 4/2005 |
| WO | 2009065637 A1 | 5/2009 |
| WO | 2010107394 A1 | 9/2010 |
| WO | 2011066468 A1 | 6/2011 |

OTHER PUBLICATIONS

Abuelela, et al.; "Notice: An Architecture for Notification of Traffic Incidents"; Department of Computer Science; Old Dominion University; Norfolk, VA.

Boyce, et al.; "Design and Implementation of ADVANCE: The Illinois Dynamic Navigation and Route Guidance Demonstration Program"; pp. 415-426.

Cova, et al.; "A network flow model for lane-based evacuation routing"; Transportation Research Part A 387; 2003; pp. 579-604; Copyright 2003 Elsevier Science Ltd.

(Continued)

*Primary Examiner* — Mary Cheung
*Assistant Examiner* — Anne Mazzara
(74) *Attorney, Agent, or Firm* — Nicholas L. Cadmus

(57) ABSTRACT

In a method for identifying a location of an incident, a computer receives data from a plurality of navigation devices. The computer determines a portion of a determined route between a first point and a second point of at least one navigation device of the plurality of navigation devices, wherein the at least one navigation devices deviated from the determined route. The computer determines that two or more portions contain a sub-portion. The computer identifies a location of an incident, wherein the location is a location of the sub-portion.

20 Claims, 4 Drawing Sheets

(56) References Cited

OTHER PUBLICATIONS

Kamran, et al.; "Detecting Traffic Incidents Based on Traffic Patterns and Vehicle Behaviours Using GPS"; Proceedings of the 18th International Conference on Systems Engineering (ISCE06); Coventry, UK; Sep. 5-7, 2006; pp. 201-206.

Kim, et al.; "Optimal Vehicle Routing With Real-Time Traffic Information"; IEEE Transactions on Intelligent Transportation Systems; vol. 6; No. 2; Jun. 2005; pp. 178-188; Copyright 2005 IEEE.

Kumar a.; "GPS-Based Road Traffic Monitoring System—A Study of the Cell Phone-Based Model"; updated May 20, 2011; Printed Aug. 29, 2012; <http://www.brighthub.com/electronics/gps/articles/43774.aspx>.

Leduc G.; "Road Traffic Data: Collection Methods and Applications"; Working Papers on Energy, Transport and Climate Change; JRC European commission; Institute for Prospective Technological Studies; Copyright European Communities 2008.

Smith, et al.; "Short-Term Traffic Flow Prediction Models—A Comparision of Neural Network and Nonparametric Regression Approaches"; IEEE; pp. 1706-1709; Copyright 1994 IEEE.

Thompson, et al.; "Using Smartphones to Detect Car Accidents and Provide Situational Awareness to Emergency Responders"; Institute for Software Integrated Systems.

"Traffice Jam Info in Real Time: ITIS Delivers Anonymised Signal Data from Over 17 Million Mobile Devices for Navigation Systems"; News—Mar. 1, 2011; Printed Aug. 31, 2012; <http://web.archive.org/web/20110724212300/http://www.itisholdings.com/article.asp?id=482>.

"Rapid Incident Detection as Easy as 1, 2, 3"; Rapid Incident Detection as Easy as 1, 2, 3—Road Traffic Technology; Aug. 11, 2011; Printed Aug. 29, 2012; <http://www.roadtraffic-technology.com/features/feature126798/>.

* cited by examiner

DETERMINING THE LOCATION OF AN INCIDENT AFFECTING TRAFFIC

FIELD OF THE INVENTION

The present invention relates generally to navigation software, and more specifically to determining a location of an incident affecting traffic.

BACKGROUND OF THE INVENTION

The Global Positioning System (GPS) is used to provide geographic and temporal information via satellite systems that interface with a GPS receiver in order to accurately identify the position of the receiver. To identify the position of the receiver, the receiver uses at least four orbiting satellites, which continuously transmit pseudo-random coded messages that include the time of each transmission as well as the satellite location during each transmission. The receiver collects the transmitted information from the satellites and determines its location based on the information (some GPS devices contain multiple receivers in order to connect with more satellites).

Once the location of the GPS receiver has been determined, a navigation program coupled with a GPS receiver can generate a travel route to a desired location, when equipped with an integrated cartographic database. Integrated cartographic databases allow users to pinpoint a desired location and define it as a destination. Subsequently, the navigation program coupled with a GPS receiver can calculate a route based on the location determined via the satellites and the integrated cartographic databases. While traveling to the desired location, the receiver maintains contact with the satellites in order to track the route traveled while simultaneously providing a same-time map for the user to monitor travel, speed, and estimated time of arrival.

SUMMARY

Aspects of an embodiment of the present invention disclose a method, computer program product, and system for identifying a location of an incident. A computer receives data from a plurality of navigation devices. The computer determines a portion of a determined route between a first point and a second point of at least one navigation device of the plurality of navigation devices, wherein the at least one navigation device deviated from the determined route. The computer determines that two or more portions contain a sub-portion. The computer identifies a location of an incident, wherein the location is a location of the sub-portion.

DETAILED DESCRIPTION

Figure 1:
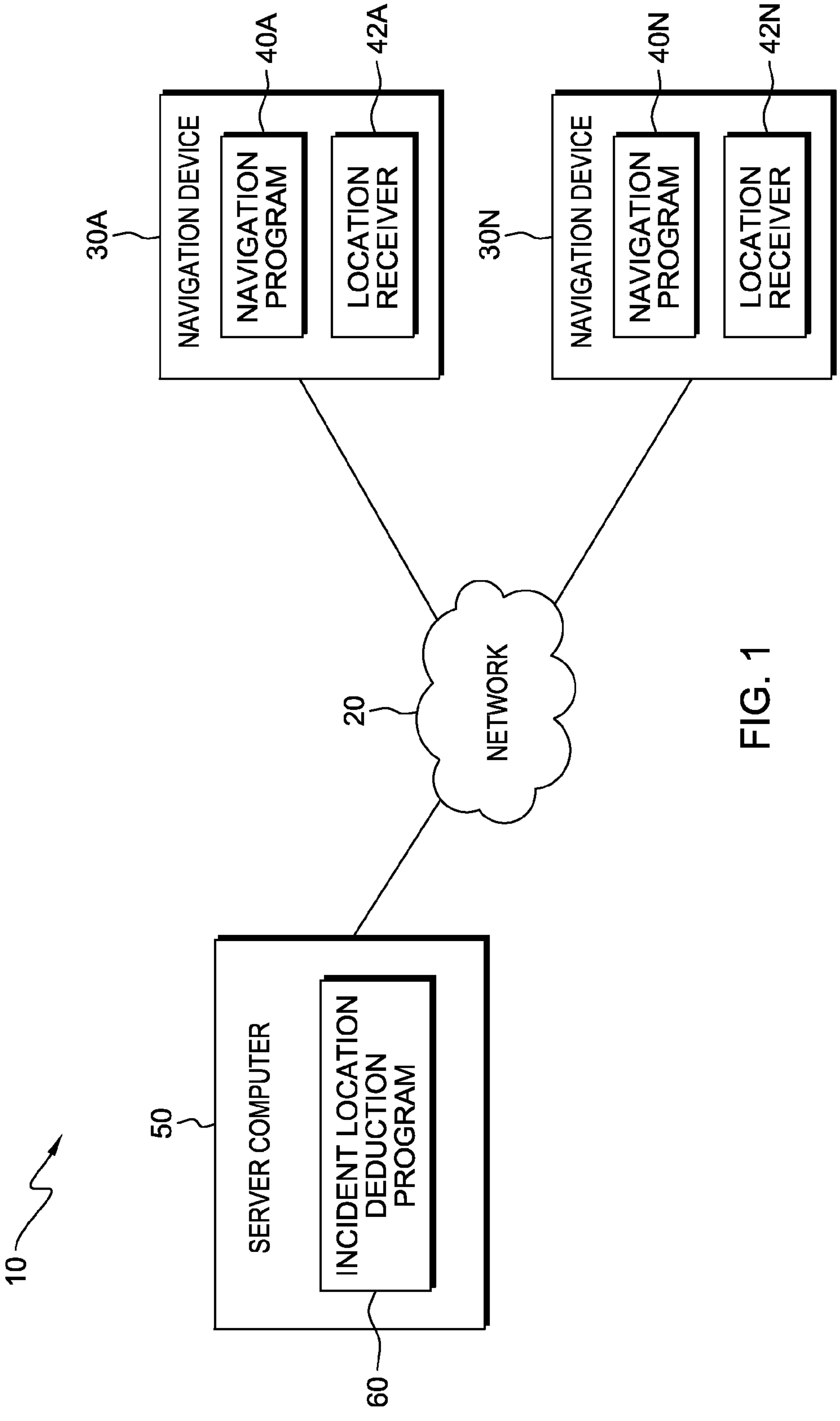
FIG. 1 is a diagram illustrating a computing system, in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram of computing system 10, in accordance with one embodiment of the present invention. FIG. 1 provides only an illustration of one embodiment and does not imply any limitations with regard to the environments in which different embodiments may be implemented.

In the depicted embodiment, computing system 10 includes two or more of navigation devices 30A through 30N (hereinafter "30A-N") and server computer 50 interconnected over network 20. Network 20 may be a local area network (LAN), wide area network (WAN), cellular data network, any combination thereof, or any combination of connections and protocols that will support communications between navigation devices 30A-N and server computer 50 in accordance with embodiments of the invention. Network 20 may include wired, wireless, or fiber optic connections. Computing system 10 may include additional servers, navigation devices, systems, computers, or other devices not shown.

Navigation devices 30A-N are Global Positioning System (GPS) navigation devices. In other embodiments, navigation devices 30A-N may be other satellite-based navigation devices, cell phones, personal digital assistants, or vehicle integrated navigation devices. In general, navigation devices 30A-N may each be any electronic device or computing system capable of sending and receiving data and communicating with server computer 50 over network 20. In one embodiment, each of navigation devices 30A-N utilizes the same satellite-based navigation system (e.g., each uses GPS, etc.), while in another embodiment more than one navigation system may be utilized (e.g., one may use GPS while another uses GLONASS, etc.).

In one embodiment, navigation devices 30A-N contain navigation programs 40A through 40N (hereinafter "40A-N"), respectively. In one embodiment, location receivers 42A through 42N (herein after "42A-N") are integrated with navigation devices 30A-N, respectively. A location receiver can determine its location and present that location as longitude and latitude coordinates. In one embodiment, location receiver 42A determines its location via a GPS system. In another embodiment, location receiver 42A determines its location via a cellular tower system or any other method. In one embodiment, an Application Programming Interface (API) (not shown) is provided for applications to receive the location of a location receiver. Location receivers 42A-N function in the same capacity.

Server computer 50 is a data server. In other embodiments, server computer 50 may be a management server, a web server, or any other electronic device or computing system capable of receiving and sending data. In other embodiments, server computer 50 may represent a server computing system utilizing multiple computers as a server system, such as in a cloud computing environment. Server computer 50 contains incident location deduction program 60.

Navigation programs 40A-N execute on navigation devices 30A-N, respectively. Navigation program 40A provides a user interface (not shown) to input a destination as well as user preferences, such as bypassing routes containing tolls. In one embodiment, a user is the operator of a motor vehicle traveling in traffic. In another embodiment, the user may be a pedestrian, a bicyclist, or a traveler using any other method of travel. Traffic is the movement of vehicles or pedestrians along a route.

Navigation program 40A also determines the initial location of navigation device 30A. In one embodiment, the initial location is the location of the navigation device when a user inputs a destination. In one embodiment, navigation program 40A calls the API of location receiver 42A in order to receive the location of navigation device 30A. Navigation programs 40A-N function in the same capacity.

In one embodiment, based on the initial location of navigation device 30A, individual user preferences, and a cartographic database, navigation program 40A determines a route from the initial location to the destination inputted into the navigation program. Navigation program 40A periodically calls the API of the location receiver 42A to receive the location of navigation device 30A as the route is traveled and the destination is reached. A route, as determined by navigation program 40A, includes a series of coordinates from the initial location of navigation device 30A to the final destination and directions for the user to follow as the user travels from the initial location to the destination, such as directions for roads to follow, turns to make, etc. Navigation program 40A sends the determined route of navigation device 30A to incident location deduction program 60 over network 20.

In another embodiment, navigation program 40A sends the initial location, destination, and user preferences to incident location deduction program 60 over network 20. As navigation device 30A follows its determined route, navigation program 40A periodically sends the location of navigation device 30A to incident location deduction program 60.

Incident location deduction program 60 operates to determine the location of an incident affecting traffic. In one embodiment, an incident affecting traffic is a motor vehicle accident that changes the flow of motor vehicles traveling on the road or highway. In another embodiment, an incident affecting traffic may be a crossing of ridden or herded animals, a forest fire, or any object or event that changes the flow of traffic. In one embodiment, incident location deduction program 60 determines a portion of a determined route, between an exit point and a return point, of one or more navigation devices of navigation devices 30A-N based on traffic data received from the navigation programs of the one or more navigation devices. Traffic data includes the routes for navigation devices 30A-N determined by navigation programs 40A-N based on a destination and user preferences inputted by the user operating the navigation program. Traffic data may also include the exit and return points of one or more navigation devices of navigation devices 30A-N that deviate from the determined routes for a portion of the route. Incident location deduction program 60 determines the location of the incident affecting traffic based on the portions of the determined routes between an exit point and a return point of one or more navigation devices of navigation devices 30A-N. See FIG. 2 for additional details and examples of this embodiment.

In another embodiment, incident location deduction program 60 determines the routes for navigation devices 30A-N based on traffic data from navigation programs 40A-N. The traffic data includes a current location, a destination, and user preferences of navigation devices 30A-N. Incident location deduction program 60 determines a portion of a determined route between an exit point and a return point of one or more navigation devices of navigation devices 30A-N based on traffic data. Incident location deduction program 60 determines the location of the incident affecting traffic based on the portions of the determined routes between an exit point and a return point of one or more navigation devices of navigation devices 30A-N. See FIG. 3 for additional details and examples of this embodiment. In one embodiment, incident location deduction program 60 is located on server computer 50. In other embodiments, incident location deduction program 60 resides on another server or another computing device, provided that incident location deduction program 60 is able to communicate with navigation programs 40A-N.

Figure 4:
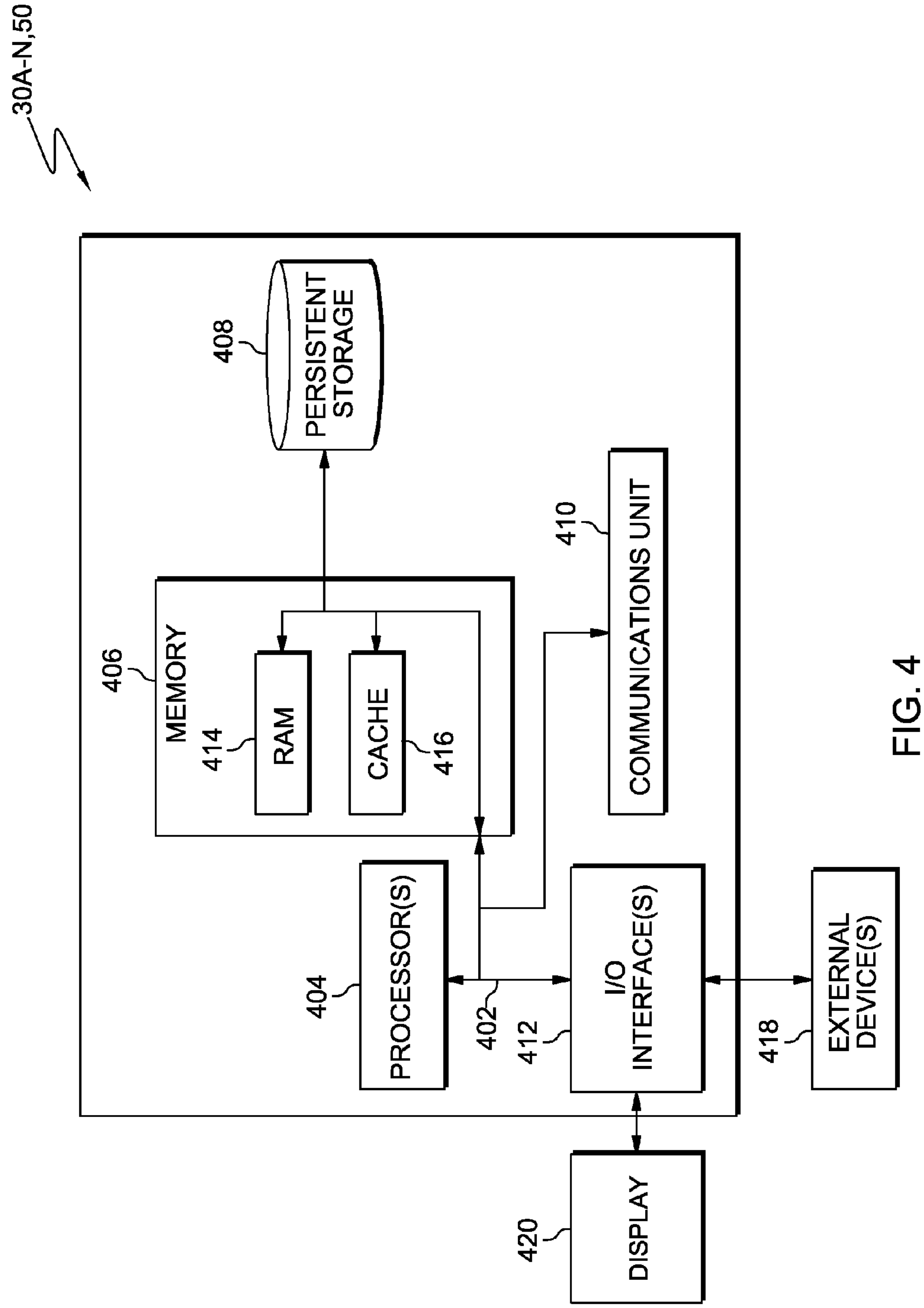
FIG. 4 depicts a block diagram of components of the navigation devices and the server computer of FIG. 1 in accordance with one embodiment of the present invention.

Navigation devices 30A-N and server computer 50 may include internal and external components as depicted in further detail with respect to FIG. 4.

Figure 2:
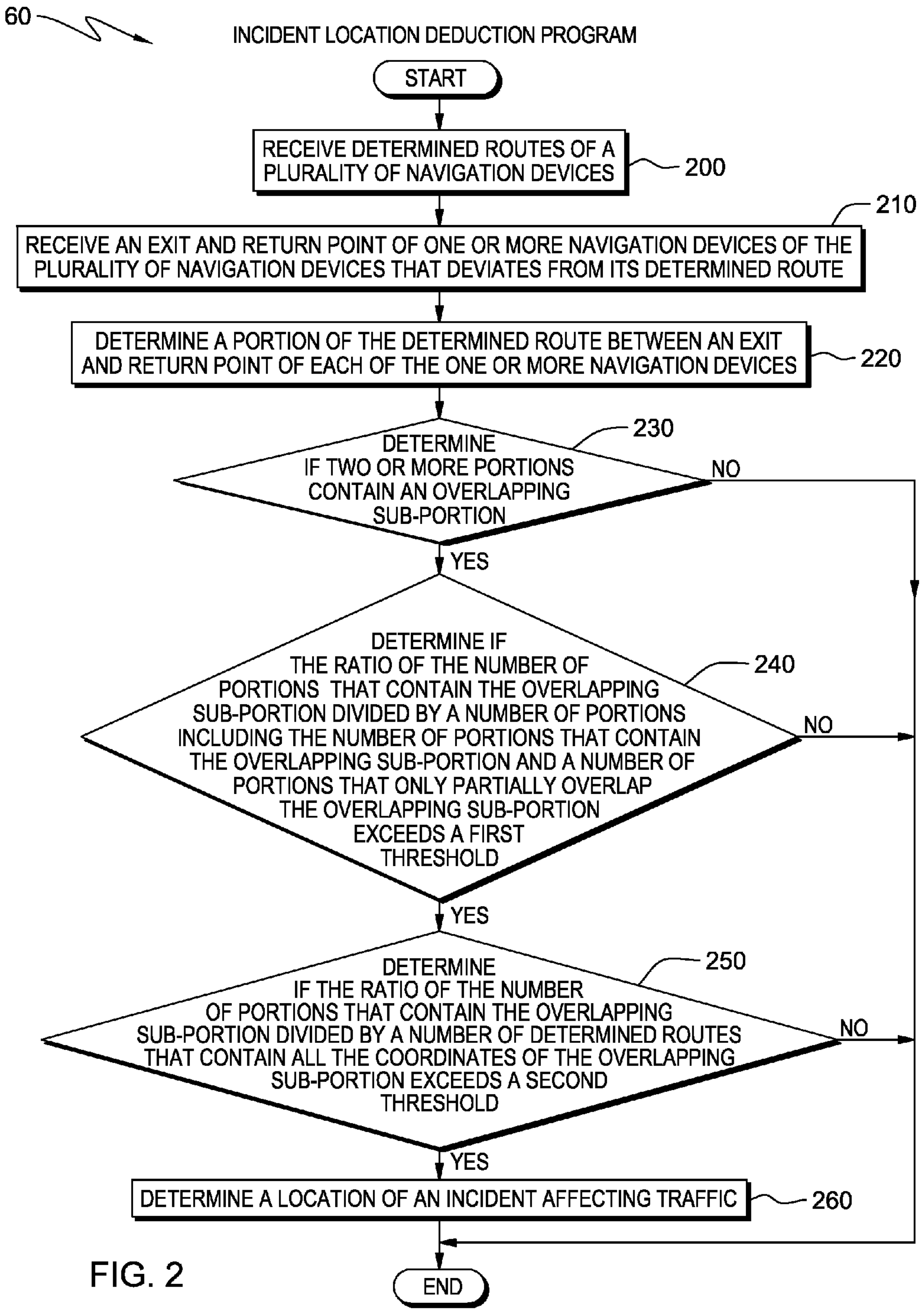
FIG. 2 depicts a flowchart of the steps of an incident location deduction program executing within the computing system of FIG. 1 in accordance with one embodiment of the present invention.

FIG. 2 depicts a flowchart of the steps of incident location deduction program 60 executing within the computing system of FIG. 1, for determining the location of an incident affecting traffic, in accordance with one embodiment of the present invention.

In one embodiment, initially, navigation program 40A provides a user interface to input a destination as well as user preferences. For example, a user may prefer a route that bypasses major highways. In one embodiment, navigation program 40A calls the API of the location receiver 42A in order to receive the initial location of navigation device 30A. Based on the initial location of navigation device 30A and individual user preferences, navigation program 40A determines a route to the destination inputted into the program. Navigation program 40A sends the determined route of navigation device 30A to incident location deduction program 60 over network 20. For example, a route, as determined by navigation program 40A, includes a series of coordinates from the initial location of navigation device 30A to the final destination and directions for the user to follow as the user travels from the initial location to the destination, such as directions for roads to follow, turns to make, etc. Navigation programs 40A-N function in the same capacity.

As navigation device 30A deviates from the determined route, navigation program 40A determines an exit point from the determined route. For example, the exit point is a coordinate of a point on the determined route at which navigation device 30A deviates from the determined route. When navigation device 30A resumes its determined route, navigation program 40A determines the return point. For example, a return point is the coordinate of a point on the determined route at which navigation device 30A resumes travel on the determined route. In one embodiment, navigation program 40A sends the exit and return points of navigation device 30A to incident location deduction program 60 one at a time as each point is determined. In another embodiment, navigation program 40A sends the exit and return points to incident location deduction program 60 simultaneously after navigation device 30A resumes the determined route.

In step 200, incident location deduction program 60 receives the determined routes of a plurality of navigation devices. For example, incident location deduction program 60 receives the determined route of navigation device 30A from navigation program 40A.

In step 210, incident location deduction program 60 receives an exit and return point of one or more navigation devices of the plurality of navigation devices that deviates from its determined route. For example, incident location deduction program 60 receives the exit and return points of navigation device 30A from navigation program 40A. In one embodiment, incident location deduction program 60 receives an exit point from navigation program 40A. When navigation device 30A resumes its determined route, incident location deduction program 60 receives a return point from navigation program 40A. In another embodiment, incident location deduction program 60 receives the exit and return point simultaneously from navigation program 40A. Incident location deduction program 60 receives exit and return points for navigation devices that deviate from their determined routes.

In step 220, incident location deduction program 60 determines a portion of the determined route between an exit and return point of each of one or more navigation devices. For example, incident location deduction program 60 determines the portion of the determined route of navigation device 30A between the exit and return points of navigation device 30A. In one embodiment, the portion of the determined route between an exit and return point is a series of coordinates of the determined route.

Incident location deduction program 60 determines if two or more portions contain an overlapping sub-portion (decision 230). In one embodiment, incident location deduction program 60 compares the portions of the determined route of each of the one or more navigation devices to determine if two or more portions contain the overlapping sub-portion. For example, incident location deduction program 60 determines if two or more coordinates from two or more potions match. In another embodiment, incident location deduction program 60 may determine that two or more portions at least partially overlap.

If incident location deduction program 60 determines that two or more portions contain an overlapping sub-portion (decision 230, yes branch), incident location deduction program 60 proceeds to decision 240. In another embodiment, if incident location deduction program 60 determines that two or more portions contain an overlapping sub-portion (decision 230, yes branch), incident location deduction program 60 proceeds to step 260 if decision 240 and decision 250 are optional. If incident location deduction program determines that two or more portions do not contain an overlapping sub-portion (decision 230, no branch), incident location deduction program 60 ends.

Incident location deduction program 60 determines if the ratio of the number of portions that contain the overlapping sub-portion divided by a number of portions including the number of portions that contain the overlapping sub-portion and a number of portions that only partially overlap the overlapping sub-portion exceeds a first threshold (decision 240). Incident location deduction program 60 determines the number of portions that only partially overlap the overlapping sub-portion. In one embodiment, incident location deduction program 60 determines if one but not all of the coordinates of the overlapping sub-portion match a coordinate of any other portions. For example, incident location deduction program 60 determines if the ratio of the number of portions that contain the overlapping sub-portion divided by a number of portions including the number of portions that contain the overlapping sub-portion and a number of portions that only partially overlap the overlapping sub-portion is greater than X. X may be a numerical value between 0-1, such as 0.3. In one embodiment, X is a value preset by a system administrator who also has the ability to adjust the value as necessary. The value can be adjusted after initial trial and error runs of incident location deduction program 60. Incident location deduction program 60 uses the first threshold to find the sub-portion that best represents the section of road which likely contains an incident. Very few navigation devices will leave the determined route and return to the determined route in the exact same place. Using the threshold ensures that the sub-portion is not too large or too small and that the sub-portion best represents the section of road which likely contains an incident.

If incident location deduction program 60 determines that the ratio of the number of portions that contain the overlapping sub-portion divided by a number of portions including the number of portions that contain the overlapping sub-portion and a number of portions that only partially overlap the overlapping sub-portion exceeds a first threshold (decision 240, yes branch), incident location deduction program 60 proceeds to step 250. If incident location deduction program 60 determines that the ratio of the number of portions that contain the overlapping sub-portion divided by a number of portions including the number of portions that contain the overlapping sub-portion and a number of portions that only partially overlap the overlapping sub-portion does not exceed the first threshold (decision 240, no branch), incident location deduction program 60 ends. In another embodiment, decision 240 is an optional step.

Incident location deduction program 60 determines if the ratio of the number of portions that contain the overlapping sub-portion divided by a number of determined routes that contain all the coordinates of the overlapping sub-portion exceeds a second threshold (decision 250). Incident location deduction program 60 evaluates the determined routes of the plurality of navigation devices to determine one or more determined routes that include coordinates matching all the coordinates of the overlapping sub-portion. Incident location deduction program 60 determines that the number of portions that contain the overlapping sub-portion divided by the number of determined routes that contain all the coordinates of the overlapping sub-portion is greater than Y.

For example, the number of navigation devices that have determined routes that have portions that contain the overlapping sub-portion will be divided by the total number of navigation devices that have determined routes that include coordinates that match all the coordinates of the overlapping sub-portion. If there are 50 navigation devices that contain the overlapping sub-portion, divided by a total of 100 navigation devices that have that have determined routes that include coordinates that match all the coordinates of the overlapping sub-portion, the value of 0.5 is compared to Y, which is a numerical value between 0-1, such as 0.3. In one embodiment, Y is a value preset by a system administrator who also has the ability to adjust the value as necessary. The value can be adjusted after initial trial and error runs of incident location deduction program 60. Incident location deduction program 60 uses the second threshold to determine if the number of navigation devices that have deviated from the sub-portion of the determined route is significant in comparison with the total number of navigation devices with determined routes that include the sub-portion (e.g., whether a sufficient proportion of the navigation devices that should have passed through that sub-portion actually chose to avoid it).

If incident location deduction program 60 determines that the ratio of the number of navigation devices that contain the overlapping sub-portion divided by the number of navigation devices that have determined routes that contain all the coordinates of the overlapping sub-portion exceeds the second threshold (decision 250, yes branch), incident location deduction program 60 proceeds to step 260. If incident location deduction program 60 determines that the ratio of the number of navigation devices that contain the overlapping sub-portion divided by the number of navigation devices that have determined routes that contain all the coordinates of the overlapping sub-portion does not exceed the second threshold (decision 250, no branch), incident location deduction program 60 ends. In another embodiment, decision 250 is an optional step.

In step 260, incident location deduction program 60 determines the location of an incident affecting traffic. In one embodiment, the location of an incident affecting traffic includes the coordinates of the overlapping sub-portion. In another embodiment, the location of an incident affecting traffic includes the coordinates where the two or more portions at least partially overlap.

Figure 3:
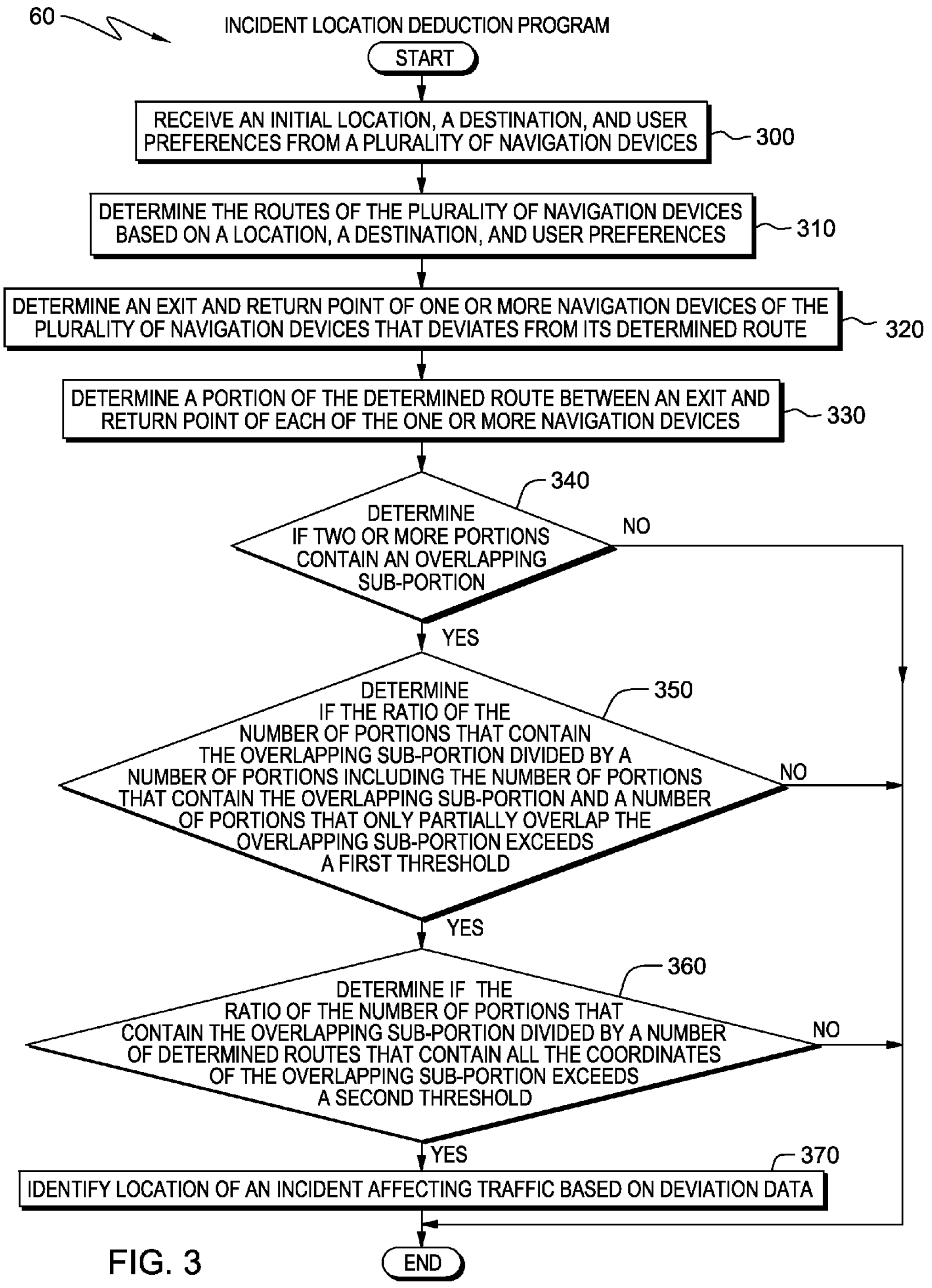
FIG. 3 depicts a flowchart of the steps of an incident location deduction program executing within the computing system of FIG. 1 in accordance with another embodiment of the present invention.

FIG. 3 depicts a flowchart of the steps of incident location deduction program 60 executing within the computing system of FIG. 1, for determining the location of an incident affecting traffic, in accordance with another embodiment of the present invention.

In one embodiment, initially, navigation program 40A provides a user interface to input a destination as well as user preferences. For example, a user may prefer a route that bypasses tolls. In one embodiment, navigation program 40A calls the API of location receiver 42A in order to receive the initial location of navigation device 30A. Navigation program 40A sends the initial location, destination, and user preferences to incident location deduction program 60 over network 20. As navigation device 30A follows its determined route, navigation program 40A periodically sends the location of navigation device 30A to incident location deduction program 60. Incident location deduction program 60 determines an exit point when it receives a coordinate from navigation program 40A not included in the route determined by the incident location deduction program. Incident location deduction program 60 determines a return point when it receives a coordinate from navigation program 40A included in the determined route after the exit point has been determined. Navigation programs 40A-N function in the same capacity.

In step 300, incident location deduction program 60 receives an initial location, a destination, and user preferences from a plurality of navigation devices. For example, incident location deduction program 60 receives an initial location, a destination, and user preferences of navigation device 30A from navigation program 40A.

In step 310, incident location deduction program 60 determines routes for the plurality of navigation devices based on the initial location, destination, and user preferences. For example, incident location deduction program 60 determines the route navigation device 30A takes based on the initial location, destination, and user preference received from navigation program 40A. Incident location deduction program 60 functions to determine the routes of navigation devices 30A-N in the same manner.

In step 320, incident location deduction program 60 determines an exit and return point of one or more navigation devices of the plurality of navigation devices that deviates from its determined route. Incident location deduction program 60 determines an exit point when it receives a coordinate from navigation program 40A not included in the route determined by the incident location deduction program. Incident location deduction program 60 determines a return point when it receives a coordinate from navigation program 40A included in the determined route after the exit point has been determined. Incident location deduction program 60 determines exit and return points for navigation devices that deviate from their determined routes.

In step 330, incident location deduction program 60 determines a portion of the determined route between an exit and return point of each of one or more navigation devices. For example, incident location deduction program 60 determines the portion of the determined route of navigation device 30A between the exit and return points of navigation device 30A. In one embodiment, the portion of determined route between an exit and return point is a series of coordinates on the determined route.

Incident location deduction program 60 determines if two or more portions contain an overlapping sub-portion (decision 340). In one embodiment, incident location deduction program 60 compares the portions of the determined route of each of the one or more navigation devices to determine if two or more portions contain the overlapping sub-portion. For example, incident location deduction program 60 determines if two or more coordinates from two or more potions match. In another embodiment, incident location deduction program 60 may determine that two or more portions at least partially overlap.

If incident location deduction program 60 determines that two or more portions contain an overlapping sub-portion (decision 340, yes branch), incident location deduction program 60 proceeds to decision 350. In another embodiment, if incident location deduction program 60 determines that two or more portions contain an overlapping sub-portion (decision 340, yes branch), incident location deduction program 60 proceeds to step 370 if decision 350 and decision 360 are optional. If incident location deduction program determines that two or more portions do not contain an overlapping sub-portion (decision 340, no branch), incident location deduction program 60 ends.

Incident location deduction program 60 determines if the ratio of the number of portions that contain the overlapping sub-portion divided by a number of portions including the number of portions that contain the overlapping sub-portion and a number of portions that only partially overlap the overlapping sub-portion exceeds a first threshold (decision 350). Incident location deduction program 60 determines the number of portions that only partially overlap the overlapping sub-portion. In one embodiment, incident location deduction program 60 determines if one but not all of the coordinates of the overlapping sub-portion match a coordinate of any other portions. For example, incident location deduction program 60 determines if the ratio of the number of portions that contain the overlapping sub-portion divided by a number of portions including the number of portions that contain the overlapping sub-portion and a number of portions that only partially overlap the overlapping sub-portion is greater than X. X may be a numerical value between 0-1, such as 0.3. In one embodiment, X is a value preset by a system administrator who also has the ability to adjust the value as necessary. The value can be adjusted after initial trial and error runs of incident location deduction program 60. Incident location deduction program 60 uses the first threshold to find the sub-portion that best represents the section of road which likely contains an incident. Very few navigation devices will leave the determined route and return to the determined route in the exact same place. Using the threshold ensures that the sub-portion is not too large or too small and that the sub-portion best represents the section of road which likely contains an incident.

If incident location deduction program 60 determines that the ratio of the number of portions that contain the overlapping sub-portion divided by a number of portions including the number of portions that contain the overlapping sub-portion and a number of portions that only partially overlap the overlapping sub-portion exceeds a first threshold (decision 350, yes branch), incident location deduction program 60 proceeds to step 360. If incident location deduction program 60 determines that the ratio of the number of portions that contain the overlapping sub-portion divided by a number of portions including the number of portions that contain the overlapping sub-portion and a number of portions that only partially overlap the overlapping sub-portion does not exceed the first threshold (decision 350, no branch), incident location deduction program 60 ends. In another embodiment, decision 350 is an optional step.

Incident location deduction program 60 determines if the ratio of the number of portions that contain the overlapping sub-portion divided by a number of determined routes that contain all the coordinates of the overlapping sub-portion exceeds a second threshold (decision 360). Incident location deduction program 60 evaluates the determined routes of the plurality of navigation devices to determine one or more determined routes that include coordinates matching all the coordinates of the overlapping sub-portion. Incident location deduction program 60 determines that the number of portions that contain the overlapping sub-portion divided by the number of determined routes that contain all the coordinates of the overlapping sub-portion is greater than Y.

For example, the number of navigation devices that have determined routes that have portions that contain the overlapping sub-portion is divided by the total number of navigation devices that have determined routes that include coordinates that match all the coordinates of the overlapping sub-portion. If there are 50 navigation devices that contain the overlapping sub-portion, divided by a total of 100 navigation devices that have that have determined routes that include coordinates that match all the coordinates of the overlapping sub-portion, the value of 0.5 is compared to Y, which is a numerical value between 0-1, such as 0.3. In one embodiment, Y is a value preset by a system administrator who also has the ability to adjust the value as necessary. The value can be adjusted after initial trial and error runs of incident location deduction program 60. Incident location deduction program 60 uses the second threshold to determine if the number of navigation devices that have deviated from the sub-portion of the determined route is significant in comparison with the total number of navigation devices with determined routes that include the sub-portion (e.g., whether a sufficient proportion of the navigation devices that should have passed through that sub-portion actually chose to avoid it).

If incident location deduction program 60 determines that the ratio of the number of navigation devices that contain the overlapping sub-portion divided by the number of navigation devices that have determined routes that contain all the coordinates of the overlapping sub-portion exceeds the second threshold (decision 360, yes branch), incident location deduction program 60 proceeds to step 370. If incident location deduction program 60 determines that the ratio of the number of navigation devices that contain the overlapping sub-portion divided by the number of navigation devices that have determined routes that contain all the coordinates of the overlapping sub-portion does not exceed the second threshold (decision 360, no branch), incident location deduction program 60 ends. In another embodiment, decision 360 is an optional step.

In step 370, incident location deduction program 60 determines the location of an incident affecting traffic. In one embodiment, the location of an incident affecting traffic includes the coordinates of the overlapping sub-portion. In another embodiment, the location of an incident affecting traffic includes the coordinates where the two or more portions at least partially overlap.

FIG. 4 depicts a block diagram of components of navigation devices 30A-N and server computer 50 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Navigation devices 30A-N and server computer 50 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Navigation programs 40A-N are stored in persistent storage 408 of navigation devices 30A-N, respectively, for execution by one or more of the respective computer processors 404 of navigation devices 30A-N via one or more memories of memory 406 of navigation devices 30A-N. Incident location deduction program 60 is stored in persistent storage 408 of server computer 50 for execution by one or more of the respective computer processors 404 of server computer 50 via one or more memories of memory 406 of server computer 50. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other servers or devices. In these examples, communications unit 410 includes one or more network interface cards. Communications unit 410 may provide communications through the use of either or both physical and wireless communications links. Navigation programs 40A-N may be downloaded to persistent storage 408 of navigation devices 30A-N, respectively, through the respective communications unit 410 of navigation devices 30A-N. Incident location deduction program 60 may be downloaded to persistent storage 408 of server computer 50 through communications unit 410 of server computer 50.

I/O interface(s) 412 allows for input and output of data with other devices that may be connected to 30A-N or server computer 50. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., navigation programs 40A-N, can be stored on such portable computer-readable storage media and can be loaded onto persistent storage 408 of navigation devices 30A-N, respectively, via the respective I/O interface(s) 412 of navigation devices 30A-N. Software and data used to practice embodiments of the present invention, e.g., incident location deduction program 60, can be stored on such portable computer-readable storage media and can be loaded onto persistent storage 408 of server computer 50 via I/O interface(s) 412 of server computer 50. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for determining a location of an incident, the method comprising the steps of:

a computer receiving data from a plurality of navigation devices;

the computer determining a plurality of portions, wherein determining the plurality of portions comprises, for each of the plurality of portions the computer determining a portion of a determined route between a first point and a second point of one navigation device of the plurality of navigation devices, wherein the one navigation device deviated from the determined route;

the computer determining that two or more portions of the plurality of portions contain a common sub-portion; and the computer identifying a location of the incident, wherein the location is a location of the common sub-portion.

2. The method of claim 1, wherein the step of the computer receiving data from a plurality of navigation devices comprises the computer receiving a determined route from each navigation device of the plurality of navigation devices.

3. The method of claim 1, wherein the step of the computer receiving data from a plurality of navigation devices comprises the computer receiving the first point and the second point of the one navigation device of the plurality of navigation devices.

4. The method of claim 1, wherein the step of the computer receiving data from a plurality of navigation devices comprises the computer receiving an initial location, a destination, and user preferences from each navigation device.

5. The method of claim 4, further comprising the step of the computer determining routes of the plurality of navigation devices based on the initial location, the destination, and the user preferences from each navigation device of the plurality of navigation devices.

6. The method of claim 1, further comprising the steps of:

the computer determining a number of portions that only partially overlap the common sub-portion; and the computer determining a number of determined routes of the plurality of navigation devices that contain all coordinates of the common sub-portion.

7. The method of claim 6, further comprising the steps of:

subsequent to the step of the computer determining that two or more portions contain a common sub-portion, the computer determining that the ratio of the number of portions that contain the common sub-portion divided by a number of portions including the number of portions that contain the common sub-portion and the number of portions that only partially overlap the common sub-portion exceeds a first threshold; and the computer determining that the ratio of the number of portions that contain the common sub-portion divided by the number of determined routes that contain all coordinates of the common sub-portion exceeds a second threshold.

8. A computer program product for identifying a location of an incident, the computer program product comprising:

one or more computer-readable storage media and program instructions stored on the one or more computer-readable storage media, the program instructions comprising:

program instructions to receive data from a plurality of navigation devices;

program instructions to determine a plurality of portions, wherein the program instructions to determine the plurality of portions comprise program instructions to, for each of the plurality of portions, determine a portion of a determined route between a first point and a second point of one navigation device of the plurality of navigation devices, wherein the one navigation device deviated from the determined route;

program instructions to determine that two or more portions of the plurality of portions contain a common sub-portion; and program instructions to identify a location of an incident, wherein the location is a location of the common sub-portion.

9. The computer program product of claim 8, wherein the program instructions to receive data from a plurality of navigation devices comprise program instructions to receive a determined route from each navigation device of the plurality of navigation devices.

10. The computer program product of claim 8, wherein the program instructions to receive data from a plurality of navigation devices comprise the program instructions to receive the first point and the second point of the one navigation device of the plurality of navigation devices.

11. The computer program product of claim 8, wherein the program instructions to receive data from a plurality of navigation devices comprise the program instructions to receive an initial location, a destination, and user preferences from each navigation device.

12. The computer program product of claim 11, further comprising the program instructions, stored on at least one of the one or more storage devices, to determine routes of the plurality of navigation devices based on the initial location, the destination, and the user preferences from each navigation device of the plurality of navigation devices.

13. The computer program product of claim 8, further comprising:

program instructions, stored on at least one of the one or more storage devices, to determine a number of portions that only partially overlap the common sub-portion; and program instructions, stored on at least one of the one or more storage devices, to determine a number of determined routes of the plurality of navigation devices that contain all coordinates of the common sub-portion.

14. The computer program product of claim 13, further comprising:

subsequent to the program instruction to determine that two or more portions contain a common sub-portion, program instructions, stored on at least one of the one or more storage devices, to determine that the ratio of the number of portions that contain the common sub-portion divided by a number of portions including the number of portions that contain the common sub-portion and the number of portions that only partially overlap the common sub-portion exceeds a first threshold; and program instructions, stored on at least one of the one or more storage devices, to determine that the ratio of the number of portions that contain the common sub-portion divided by the number of determined routes that contain all coordinates of the common sub-portion exceeds a second threshold.

15. A computer system for identifying a location of an incident affecting traffic, the computer system comprising:

one or more computer processors;

one or more computer-readable storage media;

program instructions stored on the computer-readable storage media for execution by at least one of the one or more processors, the program instructions comprising:

program instructions to receive data from a plurality of navigation devices;

program instructions to determine a plurality of portions, wherein the program instructions to determine the plurality of portions comprise program instructions to, for each of the plurality of portions, determine a portion of a determined route between a first point and a second point of one navigation device of the plurality of navigation devices, wherein the one navigation device deviated from the determined route;

program instructions to determine that two or more portions of the plurality of portions contain a common sub-portion; and program instructions to identify a location of an incident, wherein the location is a location of the common sub-portion.

16. The computer system of claim 15, wherein the program instructions to receive data from a plurality of navigation devices comprise program instructions to receive a determined route from each navigation device of the plurality of navigation devices.

17. The computer system of claim 16, wherein the program instructions to receive data from a plurality of navigation devices comprise the program instructions to receive an initial location, a destination, and user preferences from each navigation device.

18. The computer system of claim 17, further comprising the program instructions, stored on at least one of the one or more storage devices for execution by at least one of the one or more processors via at least one of the one or more memories, to determine routes of the plurality of navigation devices based on the initial location, the destination, and the user preferences from each navigation device of the plurality of navigation devices.

19. The computer system of claim 15, wherein the program instructions to receive data from a plurality of navigation devices comprise the program instructions to receive the first point and the second point of the one navigation device of the plurality of navigation devices.

20. The computer system of claim 15, further comprising:

program instructions, stored on at least one of the one or more storage devices for execution by at least one of the one or more processors via at least one of the one or more memories, to determine a number of portions that only partially overlap the common sub-portion; and program instructions, stored on at least one of the one or more storage devices for execution by at least one of the one or more processors via at least one of the one or more memories, to determine a number of determined routes of the plurality of navigation devices that contain all coordinates of the common sub-portion.

* * * * *